United States Patent
Pannell et al.

(10) Patent No.: US 6,501,761 B1
(45) Date of Patent: Dec. 31, 2002

(54) MODULAR NETWORK SWITCH WITH PEER-TO-PEER ADDRESS MAPPING COMMUNICATION

(75) Inventors: Donald Robert Pannell, Cupertino, CA (US); Robert D. Hemming, Ben Lomond, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/258,183

(22) Filed: Feb. 25, 1999

(51) Int. Cl.⁷ .......................... H04L 12/42; H04L 12/54
(52) U.S. Cl. ...................... 370/403; 370/412; 370/429; 370/452; 709/251; 710/4; 710/52; 710/132; 711/202
(58) Field of Search ................................. 370/230, 231, 370/235, 236, 357, 360, 400, 403, 404, 410, 412, 413, 428, 429, 452, 460; 709/232, 234, 238, 251; 710/3, 4, 20, 29, 52, 131, 132; 711/202, 206, 221

(56) References Cited

U.S. PATENT DOCUMENTS

| | | | | |
|---|---|---|---|---|
| 5,689,644 A | * | 11/1997 | Chou et al. ............ | 395/200.06 |
| 5,754,791 A | | 5/1998 | Dahlgren et al. ...... | 395/200.72 |
| 5,784,003 A | | 7/1998 | Dahlgren ............... | 340/825.79 |
| 5,838,937 A | * | 11/1998 | Lee et al. ............... | 395/311 |
| 5,940,596 A | * | 8/1999 | Rajan et al. ........... | 395/200.72 |
| 6,160,811 A | * | 12/2000 | Partridge et al. ........... | 370/401 |
| 6,208,864 B1 | * | 3/2001 | Pannell et al. .............. | 370/389 |
| 6,212,194 B1 | * | 4/2001 | Hsieh ......................... | 370/414 |
| 6,230,229 B1 | * | 5/2001 | Van Krevelen et al. ..... | 710/131 |

* cited by examiner

*Primary Examiner*—Alpus H. Hsu
(74) *Attorney, Agent, or Firm*—Daniel J. Bedell; Smith-Hill and Bedell (57) ABSTRACT

Modules of a network switch receive data transmissions from network stations via its I/O ports, each data transmission including an address of a source network station sending the transmission and an address of a destination station to receive the transmission. Each module receiving a data transmission either passes it on to a next module of the network switch via a ring bus or forwards it to the destination station when it is accessible via one of the module's own I/O ports. Each module includes an address translation unit mapping the network address of each station to the particular I/O port though which that network station communicates. The address translation unit updates its address-to-port mapping when a data transmission arrives at an I/O port from a source station having an unmapped or incorrectly mapped address, and then sends a mapping instruction to address translation units of all other switch modules via the ring bus telling them to similarly update their network address mappings.

17 Claims, 5 Drawing Sheets

MODULAR NETWORK SWITCH WITH PEER-TO-PEER ADDRESS MAPPING COMMUNICATION

CROSS-REFERENCE TO RELATED APPLICATIONS

The following copending U.S. applications and issued U.S. patents (incorporated by reference) include related subject matter; application Ser. No. 09/097,177, filed Jun. 12, 1998 entitled DYNAMIC PORT MODS SELECTION FOR CROSSPOINT SWITCH; application Ser. No. 09/258,181, filed Feb. 25, 1999 entitled NETWORK SWITCH WITH HEAD OF LINE INPUT BUFFER QUEUE CLEARING; application Ser. No. 09/258,182, filed Feb. 25, 1999 entitled NETWORK SWITCH WITH ZERO LATENCY FLOW CONTROL; U.S. Pat. No. 6,208,644, filed Mar. 12, 1998 and issued Mar. 27, 2001 to PANNELL et al; U.S. Pat. No. 5,940,596, filed Aug. 4, 1997 and issued Aug. 17, 1999 to RAJAN et al; and U.S. Pat. No. 6,212,194, filed Aug. 5, 1998 and issued Apr. 3, 2001 to HSIEH.

BACKGROUND OF THE INVENTION

1. Field of the Invention

The present invention relates in general to an expandable modular network switch for routing data between network stations.

2. Description of Related Art

Computer networks transfer data between computers or other types of network stations that are connected through buses to input/output (I/O) ports of a network hub or switch. A network hub is simply a repeater for receiving a data transmission at any of its I/O ports and for rebroadcasting the data transmission outward on all of its other I/O ports. Thus all network stations connected to a network hub receive all data transmissions sent to the hub. A header in each data transmission indicates the intended destination station for the data transmission, and on receiving a data transmission, each network station looks at the data transmission header to determine whether it should accept or ignore an incoming data transmission. Network hubs do not make efficient use of the bandwidth of network buses because most of the data transmission traffic a network station receives may be intended for another station.

A network switch also has I/O ports that may be connected to several network stations, but a network switch routes an incoming data transmission arriving at one I/O port only to the particular I/O port serving the network station that is to receive the data transmission. A network switch makes more efficient use of network bus bandwidth because each network station normally receives only the data transmission traffic directed to it, unless more than one station share the same switch I/O port. Since the data transmission header only indicates the destination station's network address, and does not indicate which I/O port serves the network station, the network switch must be able to translate between each network station's network address and address of the particular I/O port that serves the destination station. Network switches therefore typically include address translation units including lookup tables which convert network station addresses to I/O port addresses. Each data transmission header also includes the network address of the station sending the data transmission. Sophisticated network switches automatically learn each station's network address and build their address translation tables by reading the source address included in the header of each incoming data transmission and making note of the I/O port on which the data transmission arrived.

U.S. Pat. No. 5,754,791 entitled "Network Switch with Broadcast Support", issued Jul. 21, 1998 to Dahlgren et al describes a network switch that allows a network station to broadcast a data transmission to all network stations. The broadcasting station sets the destination address included in the data transmission header to a particular "broadcast" address. The network switch receiving the data transmission responds to the broadcast address by broadcasting the data transmission outward on all I/O ports. Also, when an incoming data transmission is addressed to a network station having a network address that a network switch has not yet learned, the network switch may broadcast the data transmission outward from all of its I/O ports in the same manner as a network hub so that each network station can examine the data transmission header and accept it if it has the correct data transmission address.

Since a network switch has a limited number of I/O ports, it can serve only a limited number of network stations. However when some of the I/O ports of a network switch are linked to I/O ports of other network switches, they form a larger network switch that can serve a larger number of network stations. One problem with interconnecting smaller network switches to form a larger network switch arises when the smaller switches don't share their address translation information. While one network switch may have logged a particular network station's address logged into its address translation table, other network switches which have not yet received a data transmission from that particular network station may not have logged the network address into their address translation tables. When a network switch receives a data transmission directed to an unmapped network address, it doesn't know which I/O port is to forward the data transmission and therefore must broadcast that data transmission outward on all of its I/O ports. Since broadcasting a data transmission ties up system resources, it would be beneficial if the various network switches could share the address translation information that they acquire.

Some prior art systems a single, central address translation server linked by a parallel bus to all network switches for mapping network addresses to the ports. Whenever a switch receives a data transmission it consults the address translation server to determine how to route the data transmission and also provides the server with information it needs to map network addresses of new stations. A central address translation server system cuts down on the need for broadcasting data transmissions because address translation information gathered by all switches is shared by all other switches. But under high traffic conditions the bandwidth of the parallel bus interconnecting the address translation server to the various network switches or the operating speed of the server itself can limit network throughput as the various switches compete for access to the address translation server.

Another inefficiency associated with interconnecting multiple network switches is that each switch along the route of a data transmission through a set of interconnected switches has to retranslate the address. The time required to translation addresses several times can increase the total time required to route a data transmission through the switches.

What is needed is network switch architecture that allows multiple interconnected network switches to be easily interconnected, which allows the network switch to share address translation information without overloading a central address translation server, and which minimizes the number of times an address must be translated when routed through several interconnect network switches. In this way, multiple switches can be interconnected or "stacked" such that they act as a single large switch.

SUMMARY OF THE INVENTION

A modular network switch in accordance with the present invention routes data transmissions between a set of network stations, each network station having a unique network address. The switch includes a set of switch modules, with each module including a set of I/O ports, each I/O having a unique port ID. Each I/O port may be linked to a network bus for conveying data transmissions to and from one more of the network stations.

In accordance with one aspect of the invention, all network switch modules are interconnected in series by a ring bus to form a loop network of switch modules. The ring bus connection to each switch module includes a set of incoming data lines through which each switch module may receive data transmissions from a preceding module of the loop network and a set of outgoing data lines through which each switch module may forward data transmissions to a next module of the loop network.

In accordance with another aspect of the invention, the ring bus also includes a set of ID lines. When a switch module is added to the network switch, each port of that module assigns itself a unique port ID by communicating with ports of other modules via those ID lines bus to learn their port IDs and then assigning itself an unassigned port ID.

In accordance with a further aspect of the invention, each switch module includes its own address translation unit for mapping the network address of each said network station to a port ID of the I/O port to which the network station is linked. The switch module consults its own address translation unit to determine how to route data transmissions though the module. The address translation unit updates its address mapping when a data transmission arrives at one of its I/O ports from a network station having an unmapped or incorrectly mapped network address. The address translation units are linked by a set of address mapping lines of the ring bus, and whenever the address translation unit of any one module updates its network address mapping, it sends a mapping instruction to address translation units of all other switch modules in turn via those mapping lines. The mapping instruction tells the other modules to similarly update their network address maps. Since the switch modules use the ring bus to share the address mapping information they acquire, each module is able to correctly route an incoming data transmission toward ports of other switch modules after any module of the switch learns the port ID associated with the destination network address.

In accordance with a still further aspect of the invention, when a switch module consults its local address translation unit and determines that an incoming data transmission is to be forwarded by a port of another module, the receiving module forwards the data transmission to the other module via the data lines of the ring bus. Along with the data transmission, the receiving module also sends the port ID of the I/O port that is to forward the transmission to its destination network station. Since the destination port ID is included with the transmission, the other switch modules that receive the transmission via the ring bus do not have to re-translate the destination address to determine where to forward the transmission.

In accordance with another aspect of the invention, in an alternative embodiment thereof, the ring bus is replaced with a parallel backplane bus.

It is accordingly an object of the invention to provide a modular network switch implementing peer-to-peer sharing of address-to-port mapping information between address translation units of the switch modules to reduce the likelihood that a module receiving an incoming transmission will not know which switch port is to forward the transmission. This is beneficial because it reduces the likelihood that the receiving switch module will have to broadcast the transmission to all I/O ports.

It is another object of the invention to provide a modular network switch which minimizes the amount of address translation information that must be sent to and from each switch module. The peer-to-peer address translation network architecture is an improvement over prior art modular systems employing centralized address translation servers because in the peer-to-peer system address translation information is sent between switch modules only when there is a change in mapping, and not whenever a data transmission arrives at any switch port.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENT(S)

Figure 1:
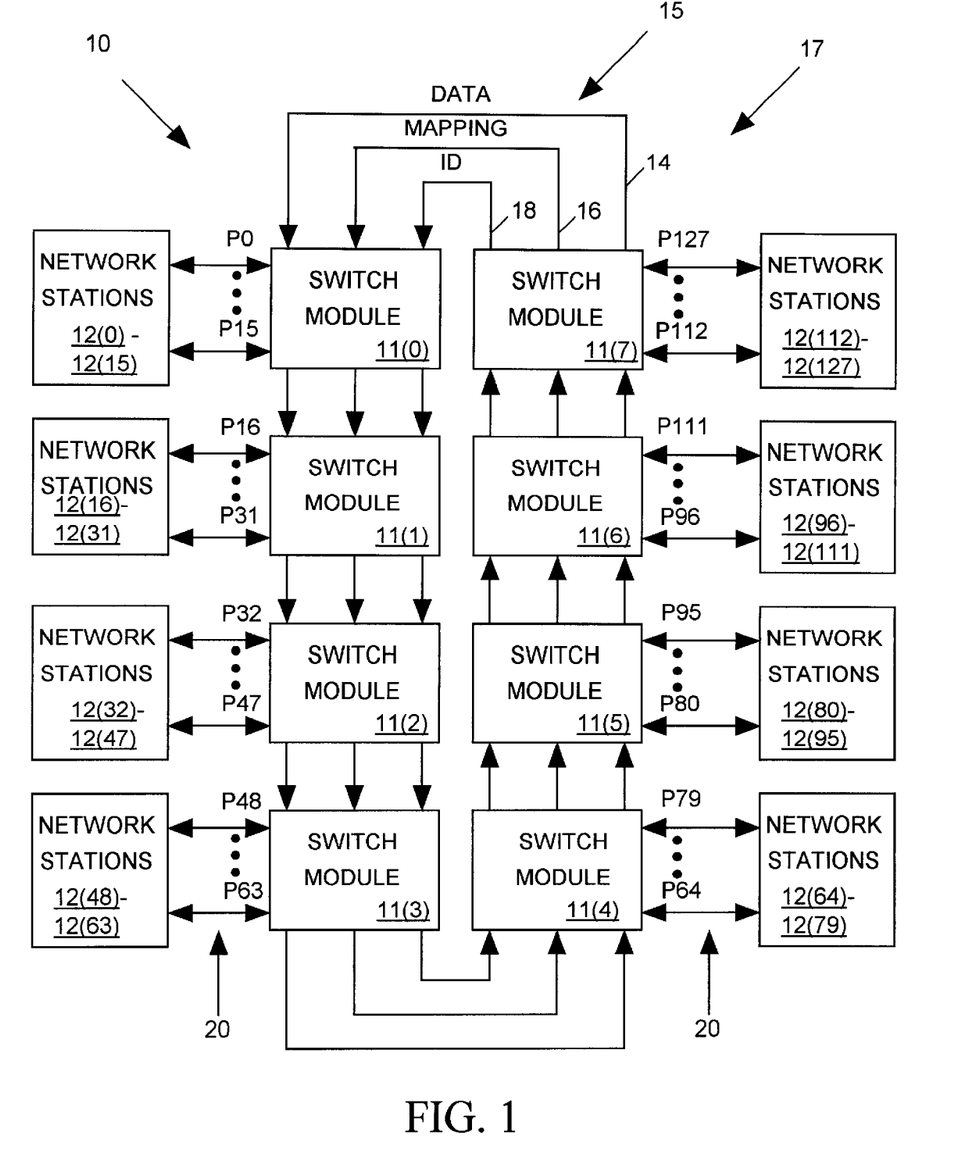
FIG. 1 illustrates a modular network switch in accordance with the present invention in block diagram form.

FIG. 1 illustrates a modular local area network (LAN) switch 10 in accordance with the present invention for routing data transmissions between a large number of network stations 12. Switch 10 is formed by a set of switch modules 11 interconnected in series via a ring bus 15 to form a loop network 17 of switch modules. Ring bus 15 includes a set of several individual data buses 14, a mapping bus 16 and an ID bus 18 (ID). In the example implementation of the invention shown in FIG. 1 switch 10 includes eight switch modules 11(0)–11(7), each having 16 input/output (I/O) ports. Each I/O port may be linked to one of up to 128 network stations 12(0)–12(127) through a correspond one of a set of bi-directional network buses 20. Although FIG. 10 illustrates switch 10 as having eight modules, the number of switch modules 11 included in switch 10 is flexible; the modulator nature of switch 10 allows it to be easily expanded or reduced by inserting or additional switch modules into, or removing switch modules from, loop network 17. Also although FIG. 1 shows each module 11 as having with 16 I/O ports, each module 11 may have more or less than 16 I/O ports and it is not necessary that all modules have the same number of I/O ports.

Data Transmission Routing

In the preferred embodiment of the invention network switch 10 is adapted for implementing the well-known Ethernet network protocol, though it may be adapted for other network protocols such as for example the well-known ATM protocol. In an Ethernet system, as well as in other types of networks, each network station 12 is assigned a unique network address. When a network station transmits a data transmission such as an Ethernet packet or an ATM cell, destined for another network station it includes the network address of the destination station (the transmission destination address), as well is its own network address (the transmission source address), in a data transmission header. For example, when an input port P0 of switch module 11(0) receives a data transmission from station 12(0) directed to station 12(63), it stores the data transmission in an internal data buffer, and then reads the data transmission's header in order to determine the network addresses of its source and destination stations.

Each of the 16 I/O ports of each switch 11 has a unique port ID differing from the ID of any other port of switch 10. Each switch module 11 maintains a lookup table mapping the address of each network station 12 to the port ID of the I/O port accessing that network station. When switch module 11(0) reads the destination address from the header of the data transmission arriving at port P0, it consults its address-to-port mapping to determine which of switch I/O ports P0–P127 serves the destination station. If the lookup table indicates that the destination station is connected to one of the local ports P0–P15 of module 11(0), module 11(0) forwards the data transmission to the appropriate local I/O port. However if the destination address is mapped to an I/O port of one of the other switch modules 11(1)–11(7), then switch module 11(0) adds the destination port ID to the data transmission and forwards the data transmission to its neighboring switch module 11(1) via a one of data buses 14 of ring bus 15.

Switch module 11(1) stores the data transmission arriving via one of data buses 14 and looks at the destination port ID now included with the data transmission to determine whether the data transmission is directed to one of its local ports P16–P31. If so, switch module 11(1) forwards the data transmission outward via the appropriate port. Note that since module 11(0) included the port ID with the data transmission when it sent it to module 11(1), module 11(1) does not have to re-translate the destination address. If the data transmission is not directed to one of ports P16–P31, switch module 11(1) forwards the data transmission to module 11(2) via one of data buses 14. Switch module 11(2) then stores the data transmission and forwards it via one of its local ports P32–P47 if the data transmission is so directed, or otherwise forwards the data transmission to switch module 11(3) via one of data buses 14. The data transmission similarly makes its way around the data transmission ring to each switch module 11 in turn until it reaches the particular module 11(3) having the intended destination port P48. Module then forwards the transmission to the destination station 12(48) via port P48 and does not pass the transmission onward to module 11(4) via a data bus 14.

Address Translation Data Sharing

Switch modules 11(0)–11(7) automatically update their internal address mapping in response to the source address included in each transmission arriving at their I/O ports. For example when a data transmission from network station 12(0) arrives at port P0 of switch module 11(0), module 11(0) not only checks its internal address mapping to determine which switch port is to receive the data transmission, it also checks the mapping to determine whether the source address is correctly mapped to port P0. If not, module 11(0) updates its internal address mapping accordingly. The address mapping must be updated, for example, when the source station 12(0) is newly connected to port P0 or has been assigned a new network address. If network station 12(0) was previously mapped to another port, module 11(0) deletes that mapping.

When it has to update an address mapping provided by its internal address translation table, switch module 11(0) sends a mapping instruction to module 11(1) via the mapping bus 16 portion of ring bus 15. The mapping instruction contains the network address of switch 12(0) and the port ID of the I/O port P0 to which it is mapped. Module 11(1) responds to the mapping instruction by updating its address translation lookup table in a similar manner and by forwarding the mapping instruction to its neighboring module 11(2) via mapping bus 16. The mapping instruction similarly makes its way around the mapping bus 16 with each switch module 11 in turn updating its address translation table and forwarding the mapping instruction to the next module. When the mapping instruction eventually makes its way back to the originating switch module 11(0) and it finds that it has already updated its lookup table in accordance with the mapping instruction, module 11(0) discards the mapping instruction without forwarding it to the next switch module. In this way all switch modules 11(0)–11(7) share the address translation information they acquire from incoming data transmissions and keep their address translation tables consistent with one another.

Switch Expansion and Port ID Assignment

Switch 10 can be expanded by inserting a new switch module 11 into loop 17 between any two existing switch modules 11. For example if switch module 11(7) had been the last module to be added to switch 10, existing ring bus 15 connections between modules 11(6) and module 11(1) would have been broken and new ring bus connections would have been established between modules 11(6) and 11(7) and between modules 11(7) and 11(1). One matter that modules 11(0)–11(7) must resolve before becoming active is the assignment of a unique port IDs to each of its I/O port.

The ports of all switch modules 11 are interconnected in a loop by ID bus 18 which forms a part of ring bus 15. When the new switch module 11 (7) is added to network loop 17, it doesn't know what IDs should be assigned to its ports because it doesn't know what port IDs are already in use by other modules. To determine an available port ID, module 11(7) initially sends a number "0" output to its neighboring switch module 11(0) via ID bus 18. If module 11(0) has a port using the P0 ID, it sends a NULL code outward to the next switch module 11(1) via ring lines 18. On the other hand, if module 11(0) does not have a port using the P0 ID, it forwards the "0" number to module 11(1) via the ring bus. Module 11(1) responds to the "0" code on the ID bus 18 in the same manner, forwarding a NULL code to module 11(2) if it has a port with ID P0 and forwarding a "0" code if it does not. Each module 11 responds to an incoming NULL code simply by forwarding the NULL code to the next module. Switch modules 11(3)–11(6) behave in a similar manner when they receive either a "0" or the NULL code. Eventually switch module 11(7) receives either a "0" or a NULL code from module 11(6) via ID bus 18. If switch module 11(7) receives the "0" code it assigns port P112 to port ID 0. If it receives the NULL code, module 11(7) knows that port ID 0 is taken and does not assign the 0 port ID to its port 11(7). Instead it sends out a "1" on ID lines 18. The other switch modules 11 then return either a "1" or a NULL code to switch module 11(7) depending on whether port ID 1 is in use. The process is repeated with module 11(7) sending out increasingly larger numbers on ring lines 18 until at last, having sent out the number 112, it finds an unused port ID and is able to assign that port number to its first port. Switch module 11(7) repeats the process to find an unused port ID for each of its other ports P113–P127. Thus it does not matter where in the loop switch module 11(7) is inserted, it will end up assigning the same set of unused port IDs to its ports.

When a new module 11 is added to loop 17, the address mapping within all other modules are reset so that no network address is mapped to any port ID. The various modules 11 then rebuild their mapping tables as new data transmissions begin to arrive at their I/O ports, using mapping instructions via bus 16 to ensure that all modules constantly update their mapping tables.

Removing Modules

When a module, such as for example module 11(7) is removed from switch 10, its neighboring modules 11(6) and 11(1) must be reconnected via ring bus 15 to close loop 17. One difficulty that arises is that since ports P112–P127 are no longer available to switch 10 and since the network stations 12(112)–12(127) are no longer accessible, the address translation information stored in the address translation tables of switch modules 11(0)–11(6) relating to those ports IDs and network station addresses is no longer correct. However modules 11(0)–11(6) eventually correct their address tables.

For example after module 11(7) is removed, an incoming data transmission may arrive at module 11(0) that is directed to the network address of the station 12(127) that formally was connected to port P127. When switch module 11(0) checks its address translation table, it learns (mistakenly) that the destination station is connected to port P127 and therefore forwards the data transmission outward via one of data transmission buses 14. Since switch module 11(7) is no longer included in switch 10, it cannot intercept the data transmission. Thus the data transmission eventually returns to module 11(0). Since the transmission conveys the port ID of one of its own ports as the source port for the transmission, module 11(0) now knows that destination port P127 no longer exists. Module 11(0) thus deletes all entries referencing port P127 from its address translation table. Module 11(0) also tells modules 11(1)–11(6) to delete those same entries from their tables by forwarding an appropriate mapping instruction to them via mapping bus 16. Of course if a data transmission is never directed to a port that has been removed from switch 10, the address translation entries to that port may never be removed from the address translation tables. The unnecessary translation entries can be problematic when entry space in the local mapping tables is needed for new entries. One way to resolve this is to program a supervisory network station to periodically transmit a data transmission to each mapped network address. If the switch module serving that address has been removed, then the remaining modules will remove the entries from their address translation tables.

Switch Module Architecture

Figure 2:
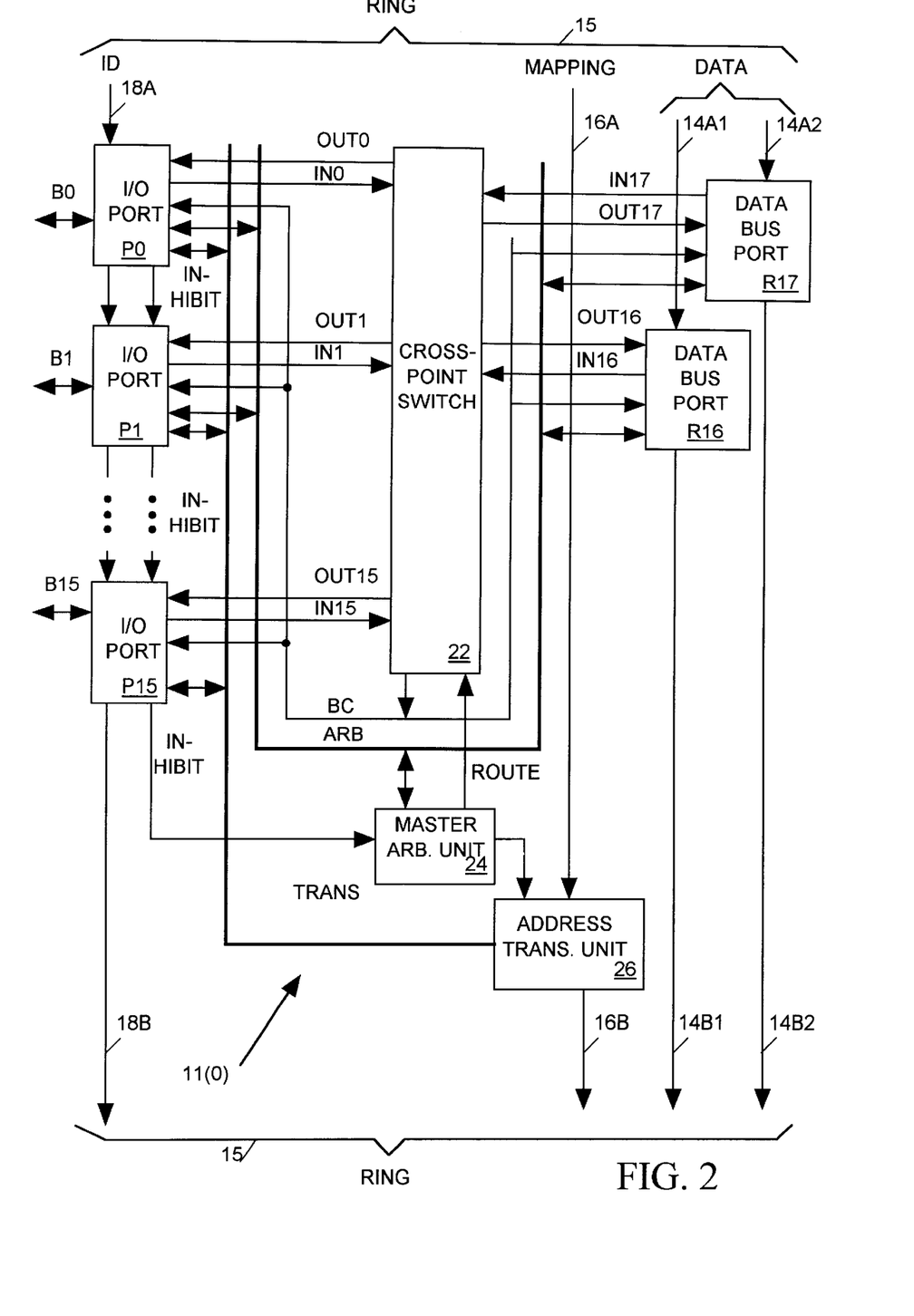
FIG. 2 illustrates a typical switch module of FIG. 1 in more detailed block diagram form.

FIG. 2 illustrates switch module 11(0) of FIG. 1 in more detailed block diagram form. Other switch modules 11(1)–11(7) are similar. Referring to FIG. 2, switch module 11(0) includes a set of sixteen I/O ports P0–P15 and two data bus ports R16 and R17 interlinked by a crosspoint switch 22 via a set of input line IN0–IN17 and a set of output lines OUT0–OUT17. A master arbitration unit 24 sends routing control data (ROUTE) to crosspoint switch 22 to configure it to provide selected paths for conveying data transmission between selected pairs of ports P0–P15, R16 and R17. Crosspoint switch 22 is capable of providing many such signal paths concurrently.

Each I/O port P0–P16 sends and receives data transmissions via a corresponding bi-directional network bus B0–B16 that may be linked to one or more network stations either directly or through another network switch or hub. Each data bus 14(1) and 14(2) includes an incoming section 14A1 or 14A2 for receiving data transmissions from the preceding switch module of the loop, in this case module 11(7) (FIG. 1). Each data bus 14(1) and 14(2) also includes an outgoing section 14B1 or 142B for transmitting data transmissions to the next switch module of the loop, module 11(2). In the example of FIG. 2, there are two data buses 14(1) and 14(2) requiring two data bus ports R16 and R17. However the number of data buses 14 can be increased by increasing the number of data bus ports R16 and R17.

Local Routing

When an incoming data transmission arrives from a source station linked to I/O port P0 via bus B0, port P0 stores the data transmission in an internal input buffer. It also reads the network station source and destination addresses from the data transmission header and sends an address mapping request to an address translation unit 26 via a translation bus (TRANS) connected in parallel to all ports P0–P15. Address translation unit 26 maintains an address lookup table relating the network address of each network station to the switch I/O port accessing that network station. When address translation unit 26 receives the mapping request, it looks up the port ID associated with the network destination address and returns that port ID to port P0 via the TRANS bus. As described in more detail below, address translation unit 26 also updates the lookup table entry, if necessary, for the source station's network address and forwards a mapping instruction to the other switch modules via an outgoing portion 16B of the mapping bus After address translation unit 26 returns the port ID of the port that is to forward the data transmission to I/O port P0, port P0 stores that port ID. When the data transmission reaches the top of its internal buffer queue, port P0 communicates with master arbitration unit 24 via an arbitration bus (ARB) to arbitrate for a connection to the forwarding I/O port. If the forwarding I/O port is one of local ports P0–P15, for example port P1, master arbitration unit 24 signals crosspoint switch 22 to establish a path between port P0 and P1 when port P1 is otherwise idle, not receiving a data transmission from another port. After establishing the data transmission routing path, arbitration unit 24 signals port P0 that its request has been granted. Port P0 responds by sending the data transmission via an incoming line IN0 of crosspoint switch 22. Crosspoint switch 22 then forwards the data transmission to an outgoing line OUT15 linked to I/O port P1. Port P1 stores the data transmission in an internal output buffer and, when the data transmission later reaches the top of the output buffer's queue, forwards the data transmission outward toward its destination station via bus B1. After receiving the data transmission, port P1 allows arbitration unit to break its connection to port P0 through switch 22 during the arbitration process when some other port requests a new path to port P1.

Ring Bus Packet Transmission

The destination port ID returned to port P0 by address translation unit 26 in response to a mapping request may reference a "remote" switch port that is not one of the ports P0–P15 that are local to switch 11(0). In such case master arbitration unit 24 routes the data transmission to either one of data bus ports R16 or R17, depending on which data bus port happens to be idle at the moment. That data bus port (for example port R16) then forwards the data transmission to its neighboring switch module 11(1) via data lines 14B1.

Whenever an I/O port P0–P15 sends a data transmission through switch 22 to another port, it includes the destination port's ID. When one of local ports P0–P11 receives a data transmission via crosspoint switch 22, it discards the port ID as it stores the data transmission in its buffer queue. However when one of data bus ports R16 or R17 receives a data transmission via crosspoint switch 22, it does not discard the destination port ID, but instead stores it in its input buffer queue along with the data transmission and later includes the destination port ID with the data transmission when it forwards the data transmission to the next switch module via one of data buses 14B1 or 142B.

Receiving Data Transmission via Ring Bus

When, for example data bus port R16 receives a data transmission via the incoming data bus 14A1 portion of ring bus 15, it stores the data transmission and the accompanying destination port ID in an input buffer queue. When the data transmission reaches the top of the queue, port R16 arbitrates for a connection to the destination port (whose port ID accompanied the data transmission) by communicating with master arbitration unit 24 via the ARB bus. If the destination port is one of local I/O ports P0–P15, for example port P15, master arbitration unit 24 signals crosspoint switch 22 to establish a path between an incoming line IN1 from data bus port R16 and an outgoing line OUT15 leading to I/O port P15. Master arbitration unit 24 then signals data bus port R16 to forward the data transmission to I/O port P15 via that path.

When the data transmission arriving at data bus port R16 via data lines 14A1 is accompanied by a destination port ID of a port within another switch module, master arbitration unit 24 establishes a connection through crosspoint switch 22 between an input line IN1 from port R16 and one of output buses OUT16 or OUT17 leading to either data bus port R16 or R17, depending on which bus port is currently idle, and then signals port R16 to begin forwarding the data transmission via line IN1. Crosspoint switch 22 then routes the data transmission to port R16 or R17. The receiving data bus port R16 or R17 forwards it to the next switch module via outgoing data bus 14B1 or 142B.

Note that when the data transmission arrived via incoming data lines 14(1), data bus port R16 did not have to access address translation unit 26 to find out the ID of the data transmission's destination port; the switch module that first received the data transmission carried out the translation and included the destination port ID with data transmission when it forwarded the data transmission via the ring bus. Thus even though a data transmission may be routed through several switch modules, address translation (which consumes time and logic) is carried out only once by the first switch module to receive the data transmission.

Broadcast Transmission

Occasionally a network station may want to broadcast a data transmission to all other network stations. To do so, the network station addresses the data transmission to a special "broadcast" network address. When a broadcast data transmission arrives, for example at port P0, the input port stores the data transmission and requests address translation unit 26 to translate the destination address into an appropriate port ID. Switch 12 has a dedicated "broadcast" output line BC connected in common to dedicated broadcast inputs of all ports P0–P15, R16 or R17. Address translation unit responds to the address translation request by returning a broadcast port ID that is associated with broadcast bus BC. When it is ready to forward the broadcast data transmission, the input port P0 receiving the data transmission communicates with master arbitration unit 24 via the ARB bus requesting a connection through switch 12 to the broadcast bus BC. When the BC bus is idle (not currently conveying a broadcast data transmission from some other port) and all ports are ready to receive another broadcast data transmission, master arbitration unit 24 establishes a connection through switch 22 between the requesting port P0 and the broadcast bus BC and signals port P0 to begin forwarding the broadcast data transmission through crosspoint switch 22. All output ports P0–P15, and one of ports R16 or R17 then concurrently receive, store and forward the broadcast data transmission arriving on bus BC.

Unknown Destination Address

Occasionally an incoming data transmission arriving, for example at port P0 will be directed to a network station having an address not mapped in the lookup table maintained by address translation unit 26. When that happens, translation unit 26 returns the broadcast port ID to the I/O port that received the data transmission. Thereafter port P0 arbitrates for a connection to broadcast bus BC and, when the connection is granted, the source port broadcasts the data transmission to every port local I/O port P0–P15, and one of data bus ports R16 or R17. The data transmission is then forwarded to every module via the data bus 14 and from each port of each module to each network station.

As previously mentioned, when any switch module 11 of FIG. 1 learns the port ID associated with any network address, it creates an entry in its lookup table mapping the network address to the port ID and also sends a mapping instruction to each other switch module via the mapping lines 16 so that each module 11 creates a similar new mapping entry in its lookup table. By sharing the address mapping information they acquire, modules 11 minimize the likelihood that an incoming data transmission will be directed to a network address that hasn't yet been mapped by the address translation unit of the receiving switch module. This in turn minimizes the likelihood that a source port will have to broadcast a data transmission to all network stations, thereby reducing system data transmission traffic.

Port IDs

Ports P0–P15 are connected in series by the ID bus 18 of FIG. 1. Each port P0–P15 includes an internal register that stores its assigned port ID, and when module 11(0) is first installed, the register in each port stores a NULL ID. ID bus 18 includes a set of lines for conveying port IDs and a line for carrying an INHIBIT signal. On system power up, each port P0–P15 checks its port ID register and, if it finds a NULL code in the register, the port asserts its output INHIBIT signal. If its input INHIBIT signal is not asserted, then the port uses the ID bus to obtain a port ID. Initially, when module 11(0) is installed in switch 10, all ports P0–P15 will have NULL codes in their port ID registers but port P0 will be the only port not receiving an asserted INHIBIT signal. Thus port P0 will use the ID bus 18 in the manner described herein above to find an unused port ID and to load it into its port ID register. It then deasserts its output INHIBIT signal, thereby allowing port P1 to obtain a port ID in a similar manner. The process continues until all ports P0–P15 have obtained a port ID. The INHIBIT output of the last port P15 is supplied as input to master arbitration unit 24. When that INHIBIT signal is deasserted, master arbitration unit 24 polls input ports P0–P15 for their port IDs via the ARB bus so that it can relate their port IDs to the terminals of crosspoint switch 22 to which they are connected.

Crosspoint Switch

Crosspoint switch 22 is described in detail in U.S. Pat. No. 5,784,003 entitled "Network Switch with Broadcast Support" issued Jul. 21, 1998 to Kent Dahlgren and incorporated herein by reference.

I/O Port

Figure 3:
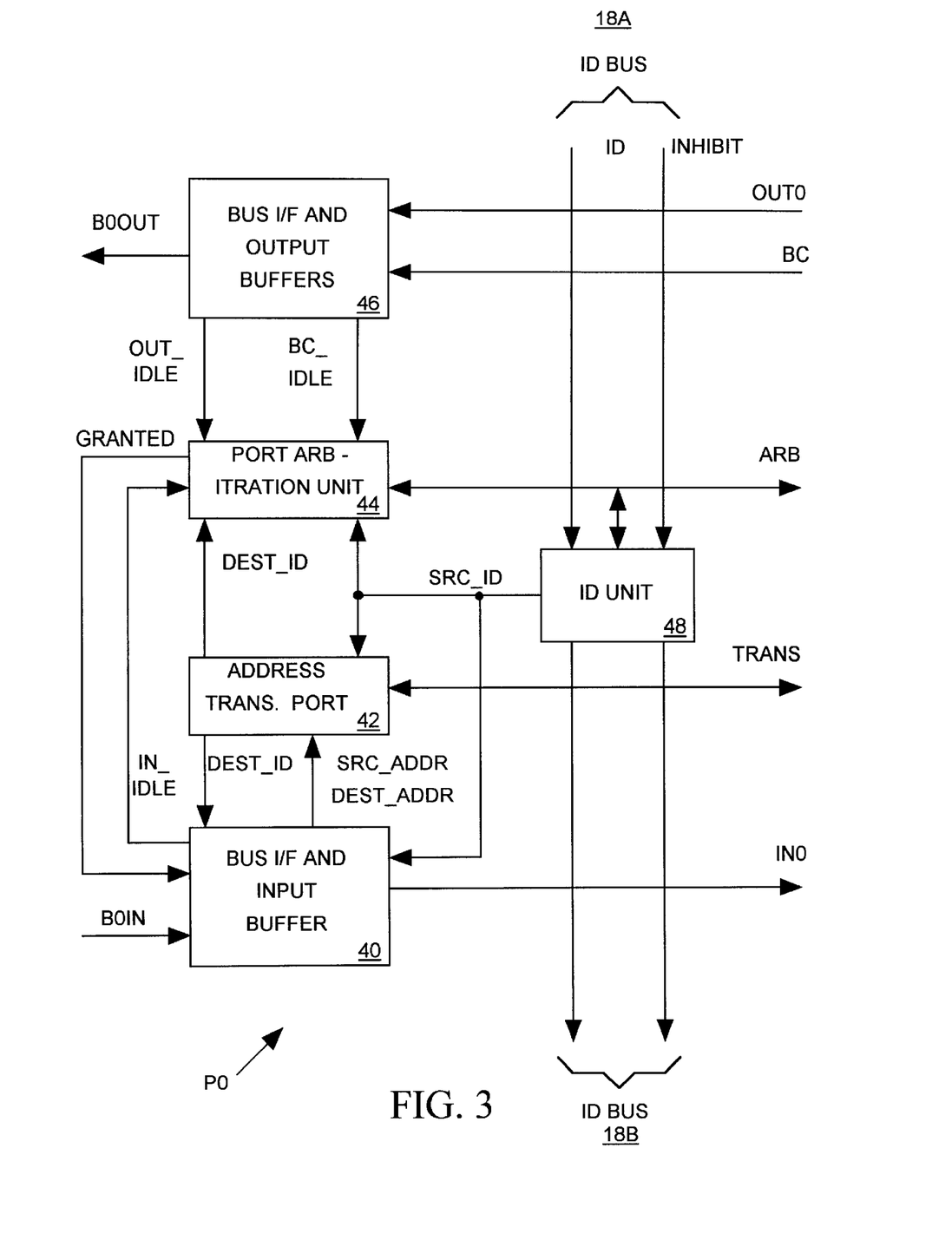
FIG. 3 illustrates a typical input/output port of FIG. 2 in more detailed block diagram form.

FIG. 3 illustrates I/O port P0 of FIG. 2 in more detailed block diagram form. Ports P1–P15 are similar. Port P0 communicates with network stations though a bi-directional bus B0 having a line B0_IN for conveying data transmissions from network stations to port P0 and a line B0_OUT for conveying data transmissions from port P0 to network stations. An input bus port and data transmission buffer 40 receives and stores incoming data transmissions via line B0_IN in an internal queue. Buffer 40 also reads the network source and destination addresses included in the data transmission's header and forwards them to an address translation interface unit 42. Interface unit 42 then sends the network source and destination addresses to the address translation unit 26 of FIG. 2 via the TRANS bus. When address translation unit 26 returns a destination port ID via the TRANS bus, translation interface unit 42 sends the destination port ID (DEST_ID) to an a port arbitration unit 44 which stores it in an internal queue. Translation interface unit 42 also returns the ID (DEST_ID) of the destination port to data transmission buffer 40 which then stores its with the data transmission in its internal data transmission queue for later transmission with the data transmission. An ID unit 48 accesses ID bus 18 to establish the value of the ID (SRC_ID) of port P0 in a manner described below. ID unit supplies the source port ID (SRC_ID) to translation interface 42 and port arbitration unit 44 for use during the address translation and port arbitration transactions and supplies SRC_ID to data transmission buffer 40. Packet buffer 40 also stores source port ID SRC_ID with each data transmission so that it can forward it and the destination port ID DEST_ID with the data transmission.

When data transmission buffer 40 is not busy sending a data transmission outward to crosspoint switch 22 of FIG. 2 via line IN0, and has at least one data transmission in its queue, it asserts an IN_IDLE signal input to port arbitration unit 44. Port arbitration unit 44 then retrieves the longest stored destination port ID (DEST_ID) from its queue and arbitrates for a connection to a port having that ID via the arbitration bus ARB. When master arbitration unit 24 establishes the connection, it signals port arbitration unit 44 via the ARB bus. Port arbitration unit 44 responds by signaling data transmission buffer 40 that the request has been granted. Input buffer 40 then forwards the next data transmission in its queue to crosspoint switch 22 of FIG. 2 via the IN0 line.

Port P0 also includes an output bus interface and data transmission buffer unit 46. Output buffer 46 includes two data transmission queues, one for storing data transmissions arriving from crosspoint switch 22 (FIG. 2) via line OUT0 and one for storing data transmissions arriving from crosspoint switch 22 via broadcast line BC. Output buffer 46 forwards data transmissions from both of its queues outward to network stations via the B0_OUT line. When output buffer 46 is not busy receiving a data transmission on the OUT0 line, it sends an OUT_IDLE signal to port arbitration unit 44. This enables port arbitration unit 44 to signal master arbitration unit 24 of FIG. 2 via the ARB bus that port P0 is ready to receive a new data transmission via the OUT0 line. Similarly, when data transmission buffer 46 is not busy receiving a broadcast data transmission on broadcast line BC, it asserts the BC_IDLE signal input to port arbitration unit 44 to allow it to signal the master arbitration unit 24 that it is ready to receive a broadcast data transmission via the BC line.

Input and output buffers 40 and 46, port arbitration unit 44 and address translation interface unit 42 are described in detail in the aforementioned U.S. Pat. No. 5,784,003 entitled "Network Switch with Broadcast Support" issued Jul. 21, 1998 to Kent Dahlgren and incorporated herein by reference.

ID Unit

Figure 4:
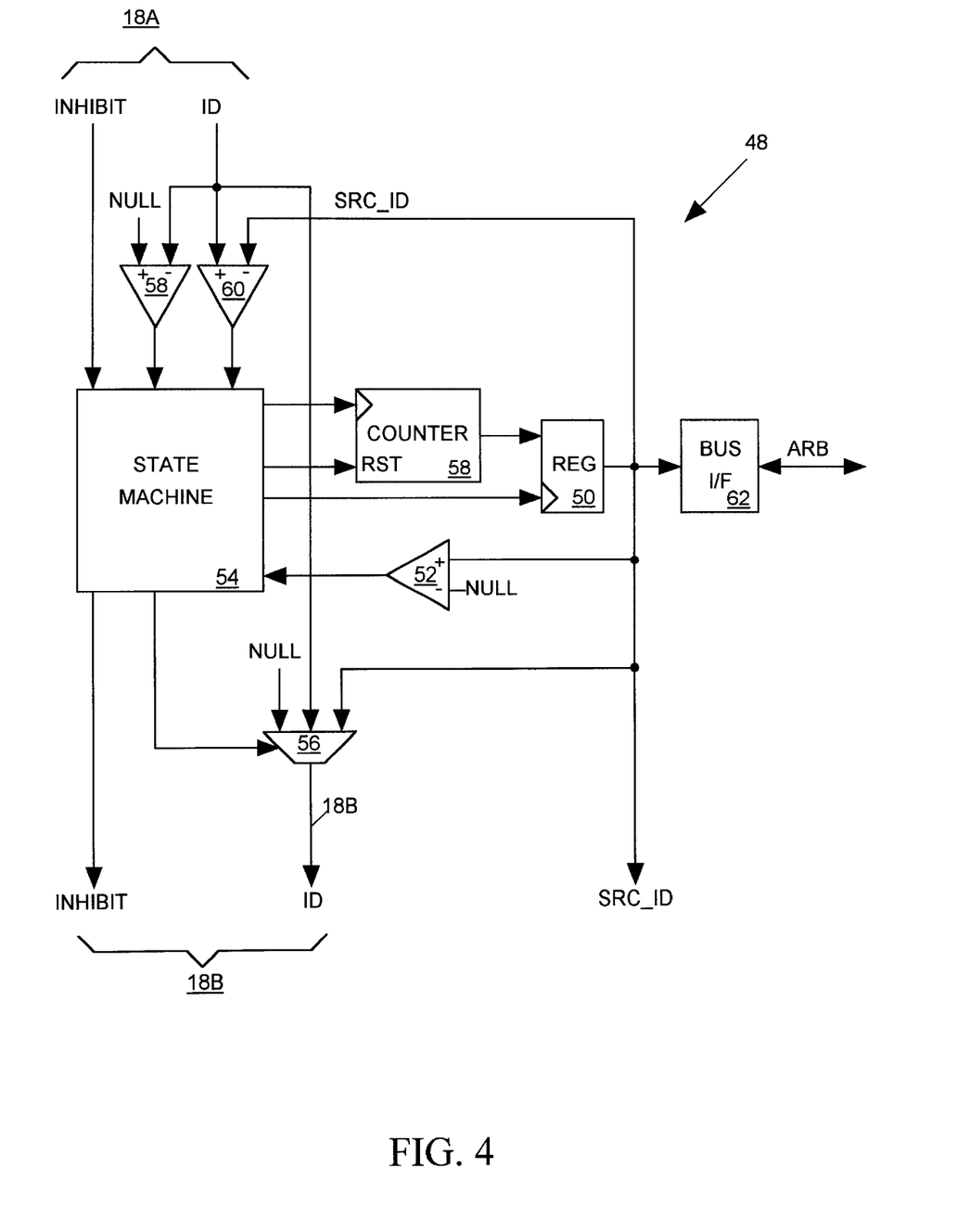
FIG. 4 illustrates the port identification unit of FIG. 3 in more detailed block diagram form.

FIG. 4 illustrates ID unit 48 of FIG. 3 in more detailed block diagram form. ID unit 48 includes a non-volatile register for storing the port's source ID (SRC_ID). Initially when the module is installed, a NULL code is stored in register 50. A comparator 52 compares the IC content of register 50 with the NULL code and signals a state machine 54 when they match. If the incoming INHIBIT signal, supplied to an input of state machine 54, is true, state machine 54 sets a multiplexer 56 to pass incoming port IDs arriving on incoming ID lines 18A outward on outgoing ID lines 18B. State machine 54 also sets its own INHIBIT signal output true.

When the INHIBIT signal turns false, state machine 54 resets a counter 58 so that it supplies a "0" port ID to input to register 50. State machine 54 then loads that "0" port ID into register 50 as SRC_ID and sets multiplexer 56 to ass SRC_ID outward on the ID lines 18B. State machine 54 then monitors the outputs of two comparators 58 and 60. Comparator 58 compares the ID on the incoming ID lines 18A to the NULL code while comparator 60 compares the incoming ID to SRC_ID. If comparator 58 thereafter signals state machine 54 that it has detected the NULL code on ID lines 18A, state machine 54 clocks counter 58 to increment its count to "1", and loads it into register 50 to that a "1" is now sent out on ID lines 18B. The process of incrementing SRC_ID continues until comparator 60 signals state machine 54 that it has detected SRC_ID on ID lines 18A. At that point state machine 54 switches multiplexer 56 to select ID lines 18A and turns off its inhibit signal, thereby allowing a next port to seek a port ID. Thereafter, whenever comparator 60 detects that the ID on ID lines 18A matches SRC_ID, state machine 54 switches multiplexer 56 to pass the NULL code to ID lines 18B.

The content of register 50 now provides the SRC_ID input to address translation interface unit 42 and port arbitration unit 44 of FIG. 3. ID unit 48 also includes a conventional bus interface unit 60 that allows master arbitration unit 24 of FIG. 2 to use lines of the ARB bus to read access the SRC_ID contents of register 50 to learn the port's new ID.

Ring Bus Ports

Ring bus ports R16 and R17 are generally similar in architecture to I/O port P0 of FIGS. 3 except that a data bus port does not employ an ID unit 48, or an address translation interface unit 42. No ID unit 48 is needed since the data bus ports R16 and R17 do not have port IDs. Address translation interface unit 42 isn't needed because the source and destination port IDs are included with the data transmissions arriving via the data bus. In a data bus port, the input data transmission buffer 40 supplies the source and destination port IDs (SRC_ID and DEST_ID) accompanying the data transmission directly to port arbitration unit 44. While one system for establishing port IDs has been shown and described, other systems may be used. For example, EDs may be provided manually through switches by a host computer writing port IDs directly into a register within each port, or other methods well known to those skilled in the art.

Arbitration Unit

Figure 5:
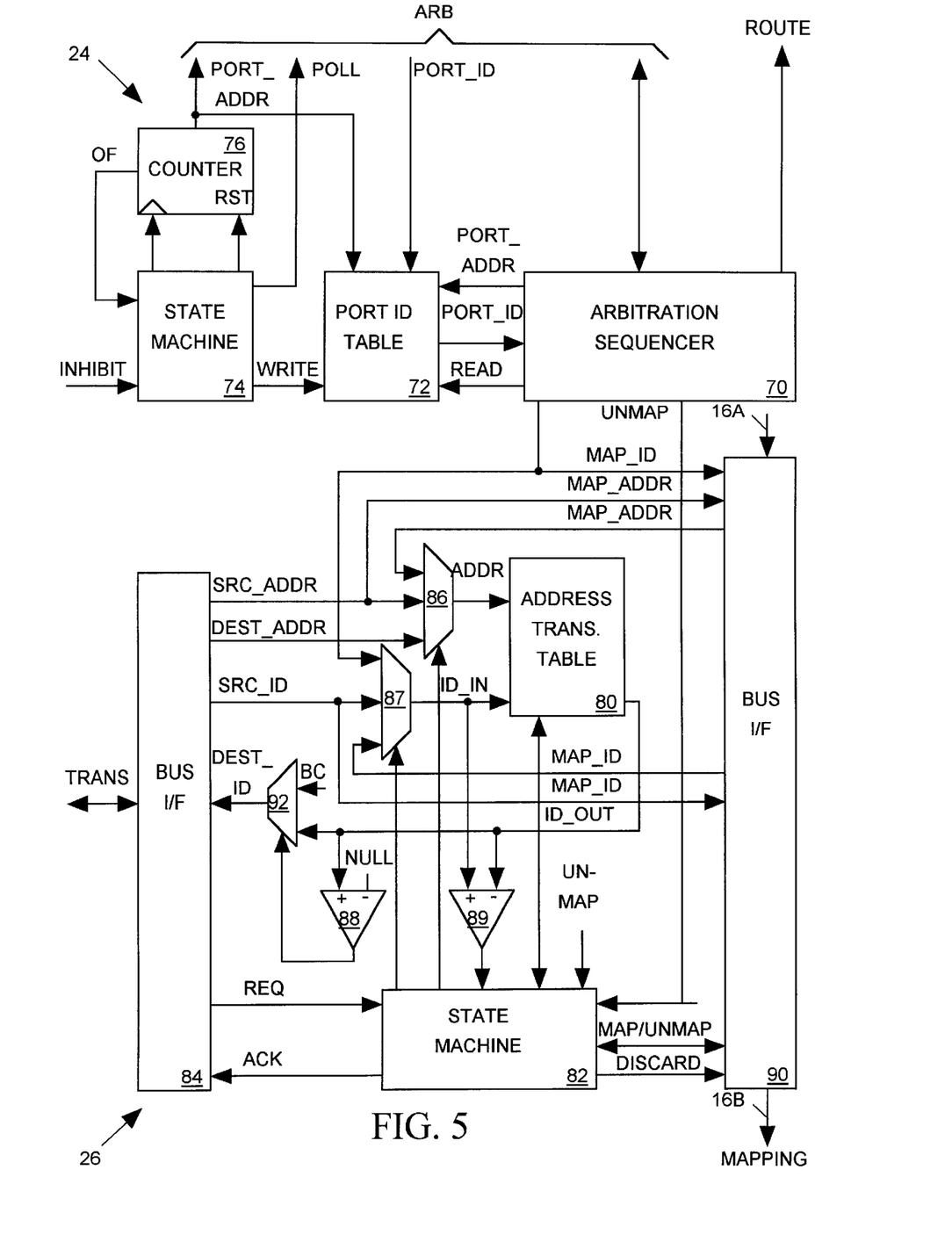
FIG. 5 illustrates the arbitration and address translation units of FIG. 2 in more detailed block diagram form.

FIG. 5 illustrates master arbitration unit 24 and address translation unit 26 of FIG. 2 in more detailed block diagram form. Master arbitration unit 24 includes an arbitration sequencer 70 linked to ports P0–P15, R16 and R17 of FIG. 2 via a set of lines ARB_CONT of the ARB bus. Arbitration sequencer 70 uses those lines to communicate with the ports when they arbitrate for connections though crosspoint switch 22 of FIG. 2. Arbitration sequencer 70 makes and breaks connections within crosspoint switch 22 via routing commands (ROUTE) it sends to the crosspoint switch. Arbitration sequencer 70 carries out an arbitration process in a manner similar to that of an arbitration sequencer described in detail in U.S. Pat. No. 5,784,003 entitled "Network Switch with Broadcast Support" issued Jul. 21, 1998 to Kent Dahlgren and incorporated herein by reference.

Arbitration sequencer 70 communicates with ports P0–P15, R16 and R17 to determine whether they are requesting a path through crosspoint switch 22 to forward data transmissions to other ports and whether they are ready to receive a data transmission from another port via switch 22. Each I/O port seeking to forward a data transmission to another port provides the ID (DEST_ID) of the requested destination port and its own ID (SRC_ID) to arbitration sequencer 70 via the ARB bus. A random-access memory lookup table 72 contains a set of entries relating the port physical address (P0–P15) of each port to its assigned port ID, which is not related to its physical address. When arbitration sequencer 70 applies the physical address (PH_ADDR) of a port to an address input of table 72, it consults table 72 and pulses a READ signal. Table 72 then reads out the port ID (PORT_ID) of the port having that physical port address. Arbitration sequencer 70 uses table 72 to determine whether DEST_ID is the ID of one of local ports P0–P15 and, if so, to determine which of ports P0–P15 is being requested. If the requested port is local, arbitration sequencer 70 establishes a data transmission routing path from the requesting port to the requested local port. If the requested port is not local, arbitration sequencer 70 assumes the requested port is in one of the other switch modules and establishes a path to an available one of data bus ports R16 and R17.

When the INHIBIT signal input to master arbitration unit 24 goes false, indicating that the ID UNITS 48 (FIG. 3) of I/O ports P0–P15 of FIG. have just finished acquiring IDs for their ports, a state machine 74 resets the output of a counter 76 to 0 and pulses a POLL signal line of the ARB bus. A set of ARB bus lines (PORT_ADDR) convey the output of counter 76 to the ID unit 48 (FIG. 3) of each port P0–P15. The ID unit 48 (FIG. 3) in port P0 responds to the "0" POLL signal value by returning its port's assigned port ID (PORT_ID) to table 72. State machine 74 then signals table 72 to load the incoming port ID into its address 0, signals counter 76 to increment its count to "1", and again pulses the POLL signal, thereby causing port P1 to return its assigned port ID as input to table 72. State machine 74 then loads that port ID into address 1 of table 72. The process is repeated to load the ID of each port into table 72. When counter 76 overflows past 15, an overflow signal OF signals state machine 74 to stop polling the ports.

When one of data bus ports R16 and R17 requests a connection though crosspoint switch 22 via the ARB bus, it provides arbitration sequencer 70 with the port ID (SRC_ID) of the source switch port that originally received the data transmission. Arbitration sequencer 70 consults table 72 to determine whether SRC_ID is one of the IDs included in port ID table 72. If not, arbitration sequencer 70 routes the data transmission to the next switch module via the ring bus. If the port identified by SRC_ID is a local port, arbitration sequencer 70 knows that the data transmission has already made its way around the data bus ring without finding its destination port and that the destination port identified by the DEST_ID value is no longer accessible. Arbitration sequencer 70 pulses an UNMAP_OUT signal to request address translation unit to remove any instances of network address mappings to the port identified by DEST_ID from its address translation lookup table.

Address Mapping

FIG. 5 also illustrates details of address translation unit 26 of FIG. 2 including a conventional address translation table 80 for mapping network addresses to port IDs. Table 80 has a network address input (ADDR_IN), a port ID input (ID_IN), and a port ID output (ID_OUT). A state machine 82, controlling operations of table 80 may signal table 80 to create an entry mapping its input address ADDR_IN to its input port ID_IN, to read out the port ID (ID OUT) to which ADDR_IN has been previously mapped, or to delete all mapping entries relating ID_IN to any destination address. State machine 82 controls a multiplexer 86 that selects the source of ADDR_IN and a multiplexer 87 that selects the source of ID_IN.

A mapping bus port 84 receives address translation requests from ports P0–P15 via the TRANS bus and, after table 80 carries out the translation, port 84 returns the requested destination port's ID (DEST_ID) to the source port via the TRANS bus. Each address translation request includes the network addresses (SRC_ADDR and DEST_ADDR) of the source and destination stations and the port ID (SRC_ID) of the requesting port. When an address translation request arrives from one of ports P0–P15 via bus port 84, bus port 84 forwards the SRC_ADDR and DEST_ADDR address to multiplexer 86 and forwards the requesting port's ID (SRC_ID) to multiplexer 87. Bus port circuit 84 then sends a request signal (REQ) to state machine 82 indicating that a routing request is pending. State machine 82 responds by initially setting multiplexer 86 to pass the data transmission's destination address (DEST_ADDR) to table 80, and by telling address translation table 80 to read out the port ID (ID_OUT), if any, it associates with the destination address. If the address has been mapped, address translation table 80 sets ID_OUT the destination port's port ID, sends it to bus port 84 via a multiplexer 92, and then signals state machine 82. State machine 82 then sends an acknowledge signal (ACK) to bus port 84 telling it to return ID_OUT as the destination ID (DEST_ID) to the requesting source port.

When address translation table 80 has not yet mapped the destination address identified by an input ADDR_IN to a port ID, it sets ID_OUT to a NULL value. In such case a comparator 88 switches multiplexer 92 so that it passes the broadcast port ID (BC) to bus port 84 instead of ID_OUT. Thus when state machine 82 pulses the ACK signal, bus port 84 returns the broadcast port ID to the requesting port. This causes the requesting port to broadcast the data transmission everywhere in the network.

After pulsing the ACK signal input to bus port 84 to return a destination or broadcast port ID to the requesting port, state machine 82 sets multiplexer 86 to pass the source address (SRC_ADDR) included in the request to table 80, and signals address table 80 to read out the port ID, if any, associated with the source address. If a mapping entry does not exist, table 80 reads out a NULL code instead of a valid port ID. A comparator 89 compares the source ID (SRC_ID) included in the request to the port ID (ID_OUT) read out of table 80 to determine whether the mapping entry for the incoming SRC_ID exists and is up to date. If comparator 89 indicates ID_OUT does not match the source ID supplied by translation bus port 84, then state machine 82 switches multiplexer 87 to pass to table 80 the source ID (SRC_ID) included in the translation request, signals table 80 to delete any existing mapping entries for source address SRC_ADDR, and then signals table 80 to add a new entry mapping SRC_ADDR to the SRC_ID output of bus port 84.

The SRC_ADDR and SRC_ID outputs of bus port 84 are also supplied to a mapping bus port 90 accessing the outgoing MAPPING lines 16A and 16B. When state machine 82 signals address translation table 80 to create a new entry mapping the SRC_ADDR address to the SRC_ID port ID, its also signals bus port 90 telling it to send the SRC_ADDR and SRC_ID outward on lines 16B as a mapping command input to the next switch module. That mapping command eventually reaches all of the modules in the mapping bus loop telling them to update their address translation table entries in a similar manner.

Mapping bus port 90 also receives mapping commands arriving on incoming mapping lines 16A from other switch modules, supplies the network address (MAP_ADDR) and port ID (MAP_ID) to be mapped to multiplexers 86 and 87, and signals state machine 82 to carry out a mapping operation. State machine 82 then switches multiplexers 86 and 87 to pass the MAP_ADDR and MAP_ID outputs of mapping bus port 90 as ADDR_IN and ID_IN to table 80 and signals table 80 to read out the port ID (ID_OUT) if any, associated with the incoming MAP_ADDR. If comparator 88 indicates that ID_OUT does not match IDIN, then state machine 82 tells table 80 to delete any mapping entries for ADDR and to create a new entry mapping ADDR to IDIN. State machine 82 also signals mapping bus port 90 to pass the mapping command outward to the next switch module via mapping bus 16B.

When a mapping command originated by address translation unit 26 makes its way around the mapping bus loop 16 and returns to mapping bus port 90, then when state machine signals address translation table 80 to read out ID_OUT IDIN and IDOUT will match because the table entry will have been previously updated when the mapping command was originally sent out on the MAPPING bus. In such case comparator 89 will signal state machine 82 that the input and output port IDs match and state machine 82 will respond by signaling mapping bus port 90 to discard the mapping command without forwarding it to the next switch module.

Address Unmapping

As mentioned above, arbitration sequencer 70 looks at the source port ID that accompanies data transmissions being forwarded by data bus ports R16 and R17 to determine whether the data transmission originated from a port of the local switch module. If so, it knows that the data transmission has made its way around the ring bus without finding the destination port to which it is addressed. In such case sequencer 70 forwards the destination port ID as a MAP_ID input to multiplexer 87 and to mapping bus port 90, and the signals state machine 82. State machine 82 responds by switching multiplexer 87 to pass the MAP_ID output of sequencer 70 to table 80 and by signaling table 80 to delete all entries for that port ID. State machine 82 also signals mapping bus port 90 to send the MAP_ID output of sequencer 70 outward via the MAPPING bus as an "unmapping" instruction to the other switch modules. This causes them to perform the same unmapping operation in their address translation tables.

When an unmapping command arrives via mapping bus 16A, mapping bus port 90 supplies the incoming MAP_ID to multiplexer 87 and signals state machine 82 to perform the unmapping operation. State machine 82 then switches multiplexer 87 to pass the MAP_ID output of mapping bus port 90 as the ID_IN input table 80 and signals table 80 to delete any current entries relating to MAP_ID. If it does have one or more such entries it deletes them and signals state machine 82 that the port ID has been unmapped. State machine 82 then signals bus port 90 to forward the unmapping command to the next switch module by mapping bus 16B. If the local module initiated the unmapping command, then address translation table 80 will have already unmapped the entry or entries relating to the MAP_ID output of mapping bus port 90. In such case, address translation table 80 will signal state machine 82 that it has no entry for ID_IN. State machine 82 responds by signaling mapping bus port 90 to discard the unmapping command without passing it on to the next switch module.

Thus has been shown and described a modular network switch architecture that allows multiple interconnected network switch modules to be easily added to the switch to expand its routing capacity. The modular network switch efficiently routes data transmissions through multiple switch modules without requiring each module handling the data transmission to carry out time-consuming and logic consuming address translations. The peer-to-peer nature of the address translation system enables the modules to share address translation information to minimize the likelihood that any module will have to broadcast a data transmission because it has not yet learned its destination port. Finally the ring bus architecture of the modular switch makes efficient use of the bandwidth of data buses interconnecting the switch modules, thereby minimizing the likelihood that data transmissions will be blocked by heavy traffic between switch modules.

While the forgoing specification has described preferred embodiment(s) of the present invention, one skilled in the art may make many modifications to the preferred embodiment without departing from the invention in its broader aspects. For example, those skilled in the art will appreciate that the modular switch architecture is suitable for use with a variety of network data transmission and bus protocols. Also note that any of switch ports P0–P127 of FIG. 1 can be connected to multiple network stations either directly or indirectly through other network switches or hubs. The appended claims therefore are intended to cover all such modifications as fall within the true scope and spirit of the invention.

What is claimed is:

1. A modular network switch (10) for routing data transmissions between a plurality of network stations (12), each network station having a unique network address, each data transmission including a source network address of a source network station sending the data transmission and a destination network address of a destination station to receive the data transmission, the network switch comprising:

a bus (15);

a plurality of switch modules (11), each switch module having a plurality of I/O ports (P0–P15), each for communicating with a corresponding one of said network stations, and all switch modules being interconnected by said bus to form a network (17) through which each switch module receives data transmissions from a preceding module of said network and sends data transmissions to a next module of said network, wherein each I/O port is assigned a unique port ID, wherein each switch module maintains a lookup table mapping the network address of each said network station to a port ID of one of said I/O ports with which it communicates, wherein each said switch module updates its lookup table mapping when it receives a data transmission from a network station having an network source address that said lookup table does not yet map to a port ID, and wherein each said switch modules sends a mapping instruction to others of said switch modules via said bus whenever it updates its lookup table mapping, the mapping instruction indicating a manner in which it updated its lookup table mapping.

2. The modular network switch in accordance with claim 1 wherein upon receiving a mapping instruction from another switch module, each switch module checks its lookup table mapping to determine whether it has already updated its lookup table mapping in the manner indicated by the mapping instruction, and if not, updates its lookup table mapping in accordance with the mapping instruction, and forwards the mapping instruction via said bus to a next switch module of said network via said bus.

3. The modular network switch in accordance with claim 1 wherein when one of said switch modules is added to said network, each I/O port of the added switch module communicates with all I/O ports of all modules via said bus to determine their port IDs and then assigns itself a port ID not matching that of any other I/O port.

4. The modular network switch in accordance with claim 1 wherein each switch module comprises a plurality of said I/O ports, at least one data port (R16) for receiving data transmissions from a preceding switch module of said network via said bus, and for forwarding data transmissions to a next switch module of said network via said bus, routing means for selectively routing data transmissions between any two I/O ports of the switch module and between any I/O port of said switch module and said data port.

5. The module network switch in accordance with claim 4 wherein each I/O port of each switch module comprises:

input buffer means (40) for receiving and storing a data transmission from a corresponding network station and for forwarding it to said routing means; and output buffer means (46) for receiving a data transmission from said routing means and for forwarding it to said corresponding network station.

6. The network switch in accordance with claim 4 wherein each I/O port of each switch module further comprises:

address translation means (42) for generating an address translation request in response to each data transmission received by said input buffer means and for receiving an address translation response in response to each generated address translation request, the address translation request conveying the network source and destination addresses included in the data transmission and conveying a port ID of the I/O port sending the address translation request, the address translation response conveying an I/O port ID of one of said I/O ports linked to a network station to receive the data transmission, and arbitration means (44) for arbitrating for a data transmission route through said routing means to said one of said I/O and data ports, and for signaling said input buffer means to forward said data transmission to said routing means when said routing request is granted.

7. The network switch in accordance with claim 6 wherein each switch module further comprises address translation means (26) for maintaining said lookup table (80), said address translation means updating said table in response to each address translation request generated by each of said I/O ports to relate the port ID and network source address included when the lookup table does not already do so, said address translation means of each switch module consulting said look up table to determine a port ID related to the network destination address and sending an address translation response containing that port ID to the I/O port that sent the address translation request.

8. The network switch in accordance with claim 7 wherein the address translation means of all switch modules are interconnected by said bus, wherein each address translation means forwards a mapping instruction to a next switch module of said network via said bus whenever it updates its lookup table, the mapping instruction indicating how it updated its lookup table, and wherein each address translation means responds to each mapping instruction received from a preceding switch module of said network via said bus by updating its lookup table in the manner indicated by the mapping instruction and by forwarding the received mapping instruction to the next network station of bus if the update indicates a change in the lookup table.

9. The modular network switch in accordance with claim 5 wherein the output buffer means of each I/O port adds the port ID of a destination I/O port to receive a data transmission to each data transmission when it forwards the data transmission to said routing means.

10. The modular network switch in accordance with claim 9 wherein the data port of each switch module sends a routing request to said address translation means in response to each data transmission received via said bus, and wherein said routing request includes a port ID added to the data transmission by another of said I/O ports.

11. The modular network switch in accordance with claim 4 wherein each of said switch modules further comprises module arbitration means (24), wherein each I/O port of said module and the data port of said module arbitrate with said module arbitration means for data transmission paths though said routing means, and wherein said module arbitration means signals said routing means to establish said data transmission paths.

12. The modular network switch in accordance with claim 11 wherein each of said I/O and data ports of said module arbitrate for a routing path through said routing means by providing said module arbitration means with a port ID of an I/O port to receive a data transmission.

13. The modular network switch in accordance with claim 12 wherein said module arbitration means signals said routing means to establish a routing path to an I/O port when, during arbitration, it receives from one of said I/O and data ports a port ID of an I/O port of its own switch module; and wherein said module arbitration means signals said routing means to establish a path to said data port when, during arbitration, it receives from one of said I/O and data ports a port ID of an I/O port of another switch module.

14. The modular network switch in accordance with claim 13 wherein each I/O port of each module communicates with all I/O ports of all modules via said bus to establish its own unique port ID.

15. The modular network switch in accordance with claim 6 wherein each I/O port of each module communicates with all I/O ports of all modules via said bus to learn their port IDs and then assigns itself its own unique port ID.

16. The modular network switch in accordance with claim 4 wherein said routing means comprises a crosspoint switch.

17. The modular network switch in accordance with claim 1 wherein said bus is a ring bus and wherein said network is a loop network.

* * * * *